United States Patent
Wei et al.

(10) Patent No.: US 6,872,587 B2
(45) Date of Patent: Mar. 29, 2005

(54) METHOD OF FABRICATING LIQUID CRYSTAL ON SILICON DISPLAY PANEL

(75) Inventors: Chung-Kuang Wei, Kao-Hsiung Hsien (TW); Wang-Yang Li, Tainan Hsien (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 0 days.

(21) Appl. No.: 10/248,469

(22) Filed: Jan. 22, 2003

(65) Prior Publication Data

US 2003/0138982 A1 Jul. 24, 2003

(30) Foreign Application Priority Data

Jan. 24, 2002 (TW) .................................... 91101110 A

(51) Int. Cl.[7] .............................................. H01L 21/00
(52) U.S. Cl. ........................................ 438/30; 438/609
(58) Field of Search ............................. 438/30, 29, 75, 438/448, 609, 969

(56) References Cited

U.S. PATENT DOCUMENTS

| | | | |
|---|---|---|---|
| 5,570,216 A | 10/1996 | Lu et al. | |
| 5,767,828 A | 6/1998 | McKnight | |
| 5,963,289 A | 10/1999 | Stefanov et al. | |
| 6,208,392 B1 * | 3/2001 | Miller et al. | 349/84 |
| 6,501,525 B2 * | 12/2002 | Huang et al. | 349/150 |
| 6,521,475 B1 * | 2/2003 | Chen et al. | 438/34 |
| 6,636,287 B1 * | 10/2003 | McKnight | 349/139 |
| 6,639,714 B2 * | 10/2003 | Smith et al. | 359/321 |
| 6,669,520 B2 * | 12/2003 | Hung et al. | 445/24 |

* cited by examiner

*Primary Examiner*—David Nhu
(74) *Attorney, Agent, or Firm*—Winston Hsu

(57) ABSTRACT

A semiconductor substrate with a control circuit and electrodes thereon is used in a method of fabricating a liquid crystal on silicon display panel. First, a transparent conductive layer is formed on the semiconductor substrate and a cell gap is formed between the semiconductor substrate and the transparent conductive layer. A liquid crystal filling process is performed to fill the cell gap with a liquid crystal material including liquid crystal molecules and monomers. A uniform magnetic field is formed to pass through the panel so that the liquid crystal molecules and monomers are aligned in a predetermined tilt direction along the direction of the magnetic field. Next, a curing process is performed so that the monomers form a polymer network with the predetermined tilt direction. Thus, when an electric field is formed between the electrodes and the transparent conductive layer, the liquid crystal molecules rotate along the predetermined tilt direction.

10 Claims, 7 Drawing Sheets

METHOD OF FABRICATING LIQUID CRYSTAL ON SILICON DISPLAY PANEL

BACKGROUND OF INVENTION

1. Field of the Invention

The present invention relates a method of fabricating a liquid crystal display (LCD), and more particularly, to a method of fabricating a liquid crystal on silicon (LCOS) display panel.

2. Description of the Prior Art

In modern planar display technology, plasma display panels (PDPs) and liquid crystal displays (LCDs) are popular choices. They both constitute numerous display grids called pixel cells. The former one is applied in a large-sized market and still has not reached widespread acceptance since the technique for mass production has still not been perfected and cost is high. A thin-film transistor LCD (TFT LCD), which has prevailed in recent years, is representative of the latter one and is mainly applied in the market smaller than 30 inches. During the fabrication of the TFT LCD products, however, defects such as dots or lines may occur on the LCD. Thus, compensative techniques are required to improve the production yields.

A liquid crystal on silicon (LCOS) display utilizes a silicon chip as a substrate and utilizes a standard CMOS process to form pixel cell matrices, integrated drivers, and other electronic devices on the silicon chip. An advantage of the LCOS display is its utilization of the CMOS process, since the CMOS process is well developed in the present semiconductor industry. As a result, high stability and reliability can be achieved when compared to the LCD. In addition, using this process, each pixel pitch can be shrunk to less than 10 $\mu$m, therefore high resolutions are obtained. When compared to the PDP, the LCOS display not only has an absolute superiority in cost but also has intrinsic advantages of the LCD. In addition, being assisted with adequate projection techniques, the LCOS display can further be applied in markets for large-sized displays. Therefore, the liquid crystal on silicon display attracts many major manufacturers to devote themselves to development, and is the display with the highest potential.

Please refer to FIG. 1 to FIG. 3 of schematic diagrams of a conventional method of fabricating a liquid crystal on silicon (LCOS) display panel 10. As shown in FIG. 1, the LCOS display panel 10 comprises a silicon substrate 12. An active region 14 is disposed on the silicon substrate 12. The active region 14 comprises a control circuit (not shown) and a plurality of electrodes 16, which is electrically connected to the control circuit, positioned on the surface of the active region 14. The control circuit comprises a plurality of transistors, such as CMOS transistors, arranged in a matrix form to drive the electrodes 16.

As shown in FIG. 2, an alignment film 18 is coated on the silicon substrate 12. After that, a rubbing process is then performed to form a plurality of alignment trenches by using a rubbing cloth to rub the surface of the alignment film 18.

As shown in FIG. 3, a transparent conductive layer 20, which is composed of materials with high transparence and conductivity such as indium tin oxide (ITO), is added to the silicon substrate 12. A glass substrate 22 is put on the transparent conductive layer 20 and a cell gap is left between the transparent conductive layer 20 and the silicon substrate 12. Then, a liquid crystal filling process is performed to fill the cell gap with liquid crystal so that a liquid crystal layer 24 is formed.

A liquid crystal alignment process is performed at last. The liquid crystal alignment process is used to make the liquid crystal molecules in the liquid crystal layer 24 have a predetermined tilt direction. Normally, the liquid crystal molecules in the liquid crystal layer 24 will rotate when an electric field is applied thereon. After forming this predetermined tilt direction, the liquid crystal molecules tend to rotate along the same direction, which is the predetermined tilt direction, and therefore, the liquid crystal molecules can be aligned more uniformly and the contrast of the display panel 10 can be improved. In the conventional method of fabricating an LCOS display panel, the alignment process is performed with a plurality of aligned trenches disposed on the bottom of the liquid crystal layer 24. In addition, another well-known alignment process is a polymer stabilization process. In this process, liquid crystal molecules are mixed with monomers before filling into the display panel 10 and an electric field is applied thereon so that the liquid crystal molecules and the monomers are twisted along a predetermined direction according to the direction of the electric field. Then, a curing process is performed under UV light radiation while the electric field remains. Therefore, the monomers are cured and combined to form a polymer network with the predetermined direction, which is the predetermined tile direction of the liquid crystal layer 24. Therefore, when the liquid crystal molecules in the liquid crystal layer 24 are twisted due to an electric field, the liquid crystal molecules tend to rotate along the predetermined tilt direction and therefore a better display performance is obtained.

The conventional method of fabricating the LCOS display panel is using a rubbing process to form a plurality of aligned trenches and using an external electric field to control the predetermined tilt direction of the liquid crystal molecules. Thus, when an electric field is applied to the LCOS display panel, the liquid crystal molecules rotate along the predetermined tilt direction. However, the rubbing process often damages electrical circuit parts disposed on the active region 14 on the silicon substrate 12 so that the reliability of products is deteriorated and the yield is affected. In addition, as sizes of pixels shrink, the trenches or extrusions disposed on the electrodes or between the electrodes interfere with the uniformity of the electric field. Thus, when the electric field is applied to perform the polymer stabilization process for aligning the liquid crystal molecules, the electric field is interfered and the local electric field near the electrodes is irregular. Therefore, the predetermined tilt direction of the liquid crystal molecules is irregular and the display performance is thereby decreased.

SUMMARY OF INVENTION

It is therefore a primary objective of the claimed invention to provide a method of fabricating a liquid crystal on silicon (LCOS) display panel so as to solve the aforementioned problem of damaging the chip surface or disorderly alignment in the alignment process.

In a preferred embodiment, the claimed invention provides a method of fabricating a liquid crystal on silicon (LCOS) display panel. First, a semiconductor substrate comprising a controlling circuit and a plurality of pixel electrodes electrically connected to each other disposed thereon is provided. Then, a transparent conductive layer is combined to the semiconductor substrate. A liquid crystal filling process is performed to fill the gaps between the semiconductor substrate and the transparent conductive layer with liquid crystal molecules that are premixed with monomers. After that, a magnetic field is generated and passed through the liquid crystal layer to align the liquid crystal molecules and monomers in a predetermined tilt direction. A curing process is performed with UV light irradiation to cure monomers and form a polymer network with the predetermined tilt direction. Therefore, when an electric field is applied to the liquid crystal layer, the liquid crystal molecules will twist along the predetermined tilt direction uniformly to control the screen of the display panel.

It is an advantage of the claimed invention that the method of fabrication an LCOS display panel with using a magnetic field to align the monomers not only can integrate the fabricating process more easily but also solve the problem caused by the electric field or the rubbing process in the conventional method. Therefore, the liquid crystal molecule can be aligned more uniformly so as to improve the display performance and the reliability of the LCOS display panels.

These and other objectives of the claimed invention will no doubt become obvious to those of ordinary skill in the art after reading the following detailed description of the preferred embodiment which is illustrated in the various figures and drawings.

DETAILED DESCRIPTION

Figure 1:
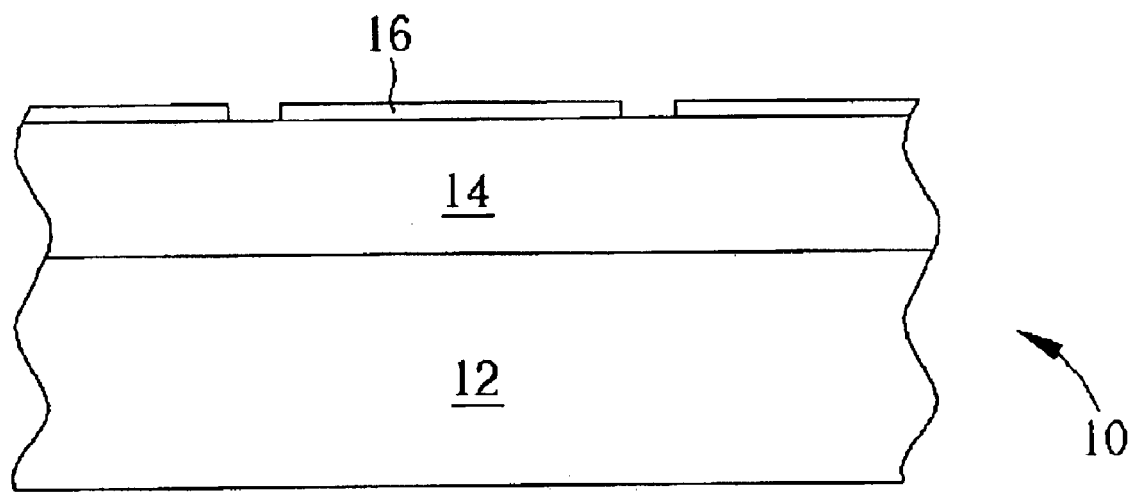
FIG. 1 to FIG. 3 are schematic diagrams of fabricating an LCOS display panel according to prior art.
Figure 2:
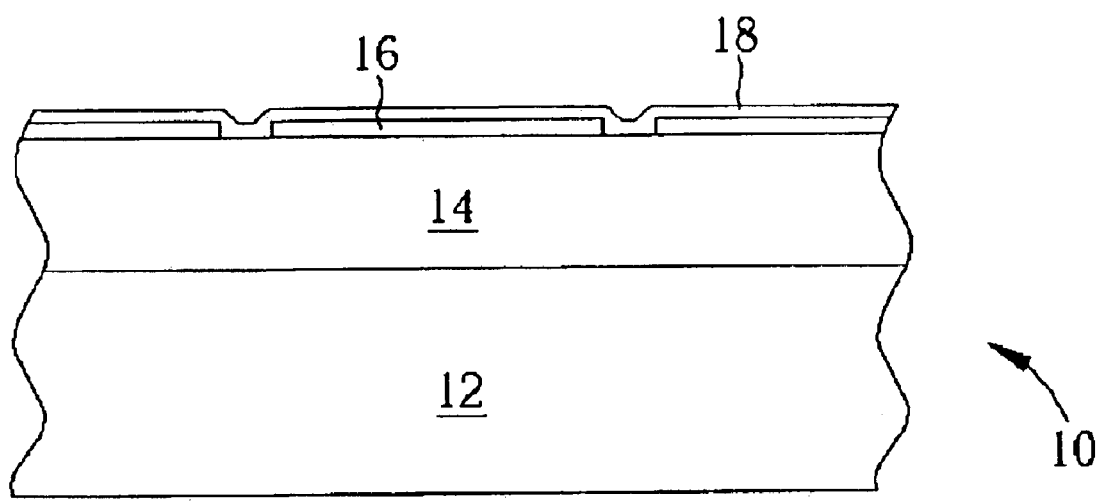
Figure 3:
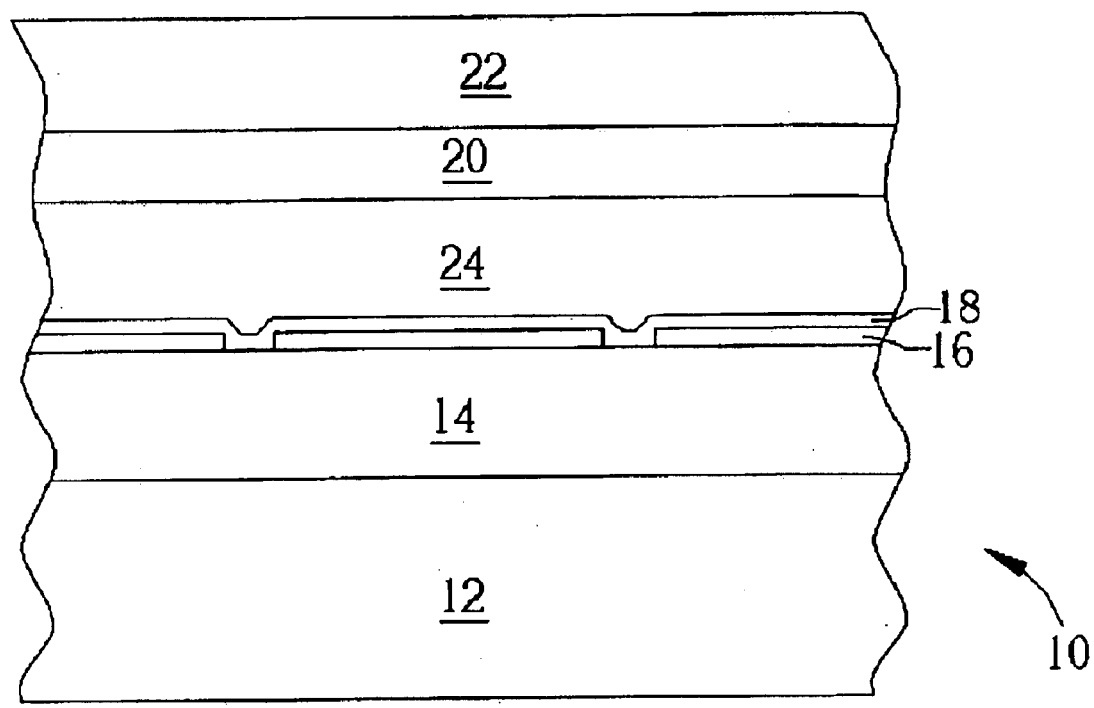
Figure 4:
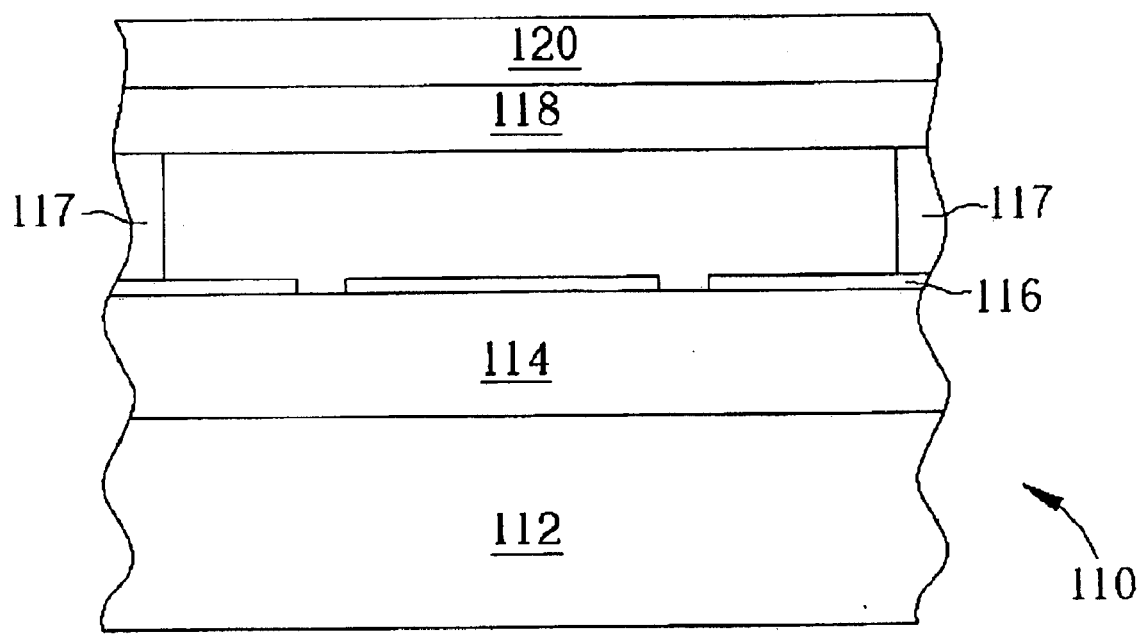
FIG. 4 to FIG. 6 are schematic diagrams of fabricating an LCOS display panel according to a first embodiment of the present invention.
Figure 5:
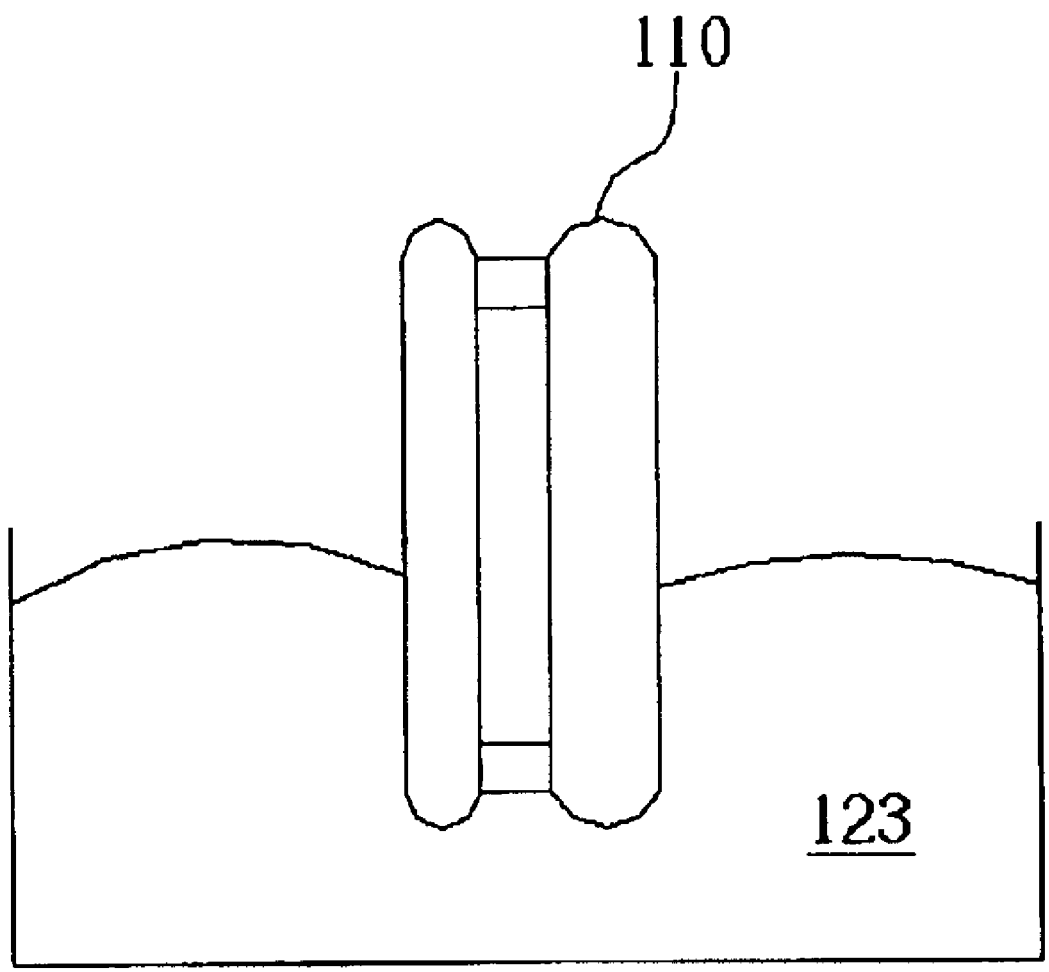
Figure 6:
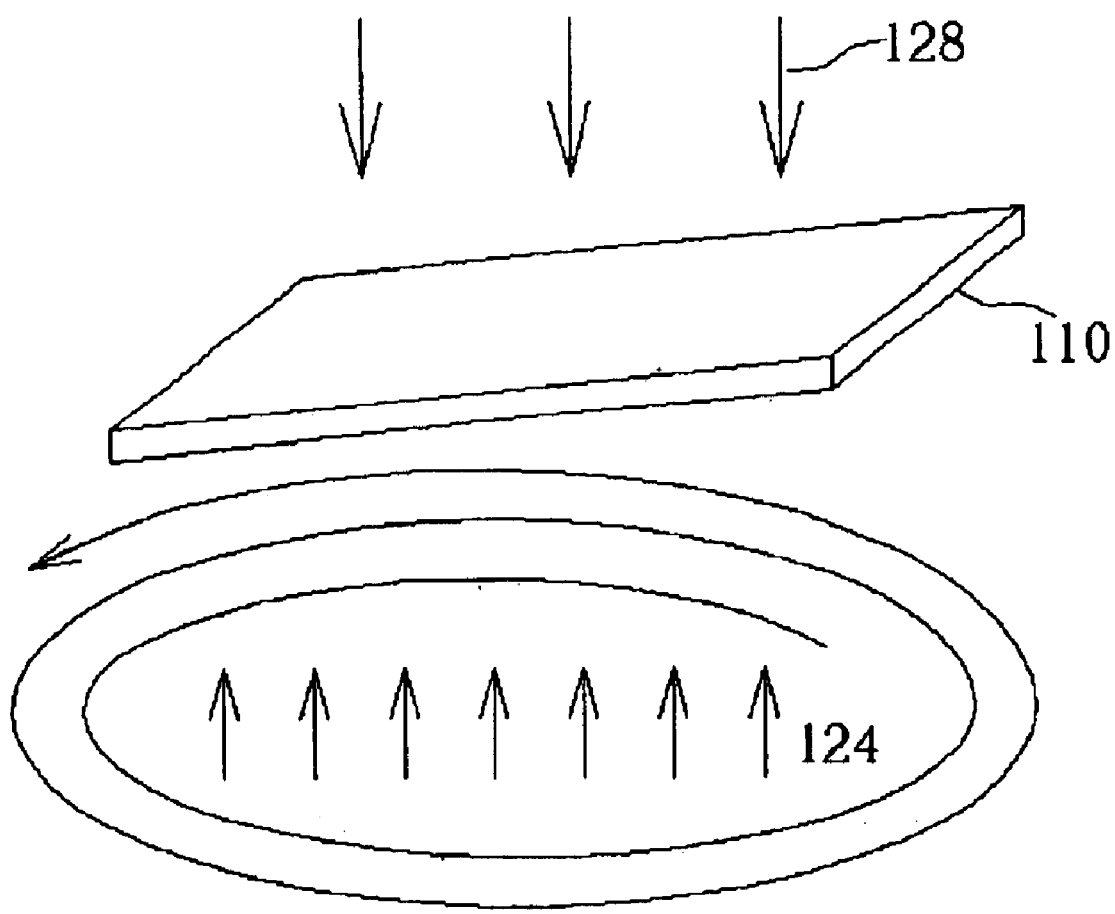

Please refer to FIG. 4 to FIG. 6 of schematic diagrams of a method of fabricating an LCOS display panel 110 according to a first embodiment of the present invention. As shown in FIG. 4, an active region 114 comprising a control circuit (not shown) and a plurality of electrodes 116 electrically connected to the control circuit is positioned on a semiconductor substrate 112, such as a silicon substrate. The control circuit comprises a plurality of transistors, such as MOS transistors, arranged in a matrix form to drive the electrodes 116. Then, a transparent conductive layer 118 is combined to the semiconductor substrate 112 with a side frame 117. Normally, the transparent conductive layer 118 is composed of a material with high transmittance and conductivity such as indium tin oxide (ITO). A cell gap is formed between the transparent conductive layer 118 and the semiconductor substrate 112. Then, a glass substrate 120 is disposed above the transparent conductive layer 118.

After that, a liquid crystal filling (LC filling) process is performed to fill the cell gap with liquid crystal. As shown in FIG. 5, a slit for liquid crystal filling is formed when the transparent conductive layer 118 is combined with the semiconductor substrate 112. Then, the slit is put under a liquid crystal solution. Thus, the liquid crystal molecules are filled into the cell gap between the transparent conductive layer 118 and the semiconductor substrate 112 due to atmospheric pressure and the capillarity so that a liquid crystal layer is formed and the slit is then sealed.

As shown in FIG. 6, a polymer stabilization process is followed to form a predetermined tilt direction in the liquid crystal layer. In the polymer stabilization process, the filled liquid crystal solution is pre-mixed with monomers. After the liquid crystal filling process, the display panel 110 is placed into a uniform magnetic field 124. Since the size of the LCOS display panel 110 is not large, only a wire surrounding the display panel 110 is required. As shown in FIG. 6, after the power is supplied to the wire, a uniform magnetic field 124 is generated. Normally, there is a tilt angle between the direction of the magnetic field 124 and the normal direction of the display panel 110. When the magnetic field 124 is applied to the display panel 110, the liquid crystal molecules and the monomers are aligned along the direction of the magnetic field 124.

A curing process is followed while the magnetic field 124 is remaining. During the curing process, the display panel 110 is irradiated with UV light 128, which is used to irradiate the display panel 110 so as to cure the monomers. Therefore, the monomers are combined to form a polymer network with a specific direction substantially parallel to the magnetic field 124, which is the predetermined tilt direction. When an electric field is applied to the liquid crystal layer, the liquid crystal molecules tend to rotate along the predetermined tilt direction uniformly so that the display performance can be improved. In the preferred embodiment of the present invention, the monomers comprise acrylate or diacrylate. The weight of the monomers is less than 5% of the liquid crystal material.

In addition, when the size of the display panel is large, it is difficult to generate a uniform magnetic field surrounding the whole display panel. Therefore, for the large-sized display panel, a movable magnetic field is often utilized to scan the display panel step by step and suitable photo masks are also used to cure the liquid crystal layer step by step.

Furthermore, the present invention can be applied to other process of fabricating the liquid crystal layer in advance. For example, the fabricating method of the present invention can be integrated with a one drop fill (ODF) process, which is a kind of liquid crystal filling process. In the ODF process, a side frame is formed on the bottom substrate such as the semiconductor substrate surrounding a predetermined region for forming the liquid crystal layer. Then, liquid crystal droplets are dripping into the predetermined region until the space surrounded by the side frame is filled. After that, a top substrate such as the transparent conductive layer is combined to the side frame and the bottom substrate.

Figure 7:
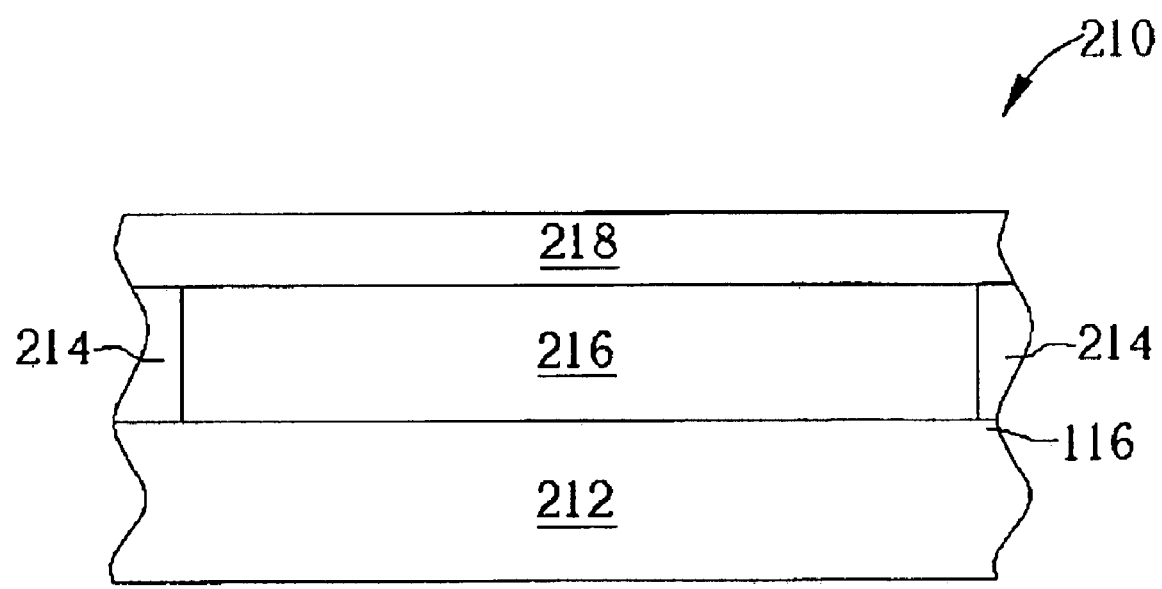
FIG. 7 is a schematic diagram of fabricating an LCOS display panel according to a second embodiment of the present invention.

Please refer to FIG. 7 of a schematic diagram of fabricating an LCOS display panel 210 according to a second embodiment of the present invention. First, a plurality of electrodes and a control circuit electrically connected to each other are formed on a semiconductor substrate 212 in the same way as the aforementioned disclosure of the first embodiment of the present invention. Then, a side frame 214, which is composed of UV curable material, is formed surrounding a predetermined region for forming a liquid crystal layer 216. The liquid crystal material drips into the predetermined region until the space surrounded by the side frame 214 is filled with liquid crystal. After that, the transparent conductive layer 218 is placed on the side frame 214. Then, a curing process is followed to cure the side frame 214 and the monomers so that the polymer stabilization process and the combination of the transparent conductive layer 218 and the semiconductor substrate 212 can be performed at the same time. The method of integrating the polymer stabilization process and the ODF process not only decreases one UV light radiation but also reduces the liquid crystal filling time of large-sized LCOS panels.

In contrast with the prior art, the present invention uses a magnetic field to align the monomers in a predetermined tilt direction instead of the electric field or the rubbing process in the prior art. When an electric field is applied to drive the display panel, the liquid crystal molecules will rotate along the predetermined tilt direction so as to control the screen contrast. Therefore, the problem caused by the irregular electric field or the damage due to the rubbing process can be avoided. In addition, the method of the present invention not only solves the problem in the prior art, but also can integrate with the ODF process in advance, for example the polymer stabilization process and the combination of the substrate can be performed in the same UV irradiation process. Therefore, one UV irradiation process is eliminated and the liquid crystal filling time of large size liquid crystal display panels is also reduced.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method of fabricating a liquid crystal on silicon (LCOS) display panel, the method comprising the following steps:

providing a semiconductor substrate;

providing a glass substrate with a transparent conductive layer;

combining the glass substrate with the transparent conductive layer onto the semiconductor substrate;

providing a liquid crystal layer including liquid crystal molecules and monomers between the glass substrate and the semiconductor substrate;

providing a magnetic field through the liquid crystal layer to align the liquid crystal molecules and monomers in a predetermined tilt direction; and curing the monomers to form a polymer network with the predetermined direction.

2. The method of claim 1 wherein the method further comprises the following steps:

forming a control circuit on the semiconductor substrate; and forming at least one electrode electrically connected to the control circuit on the semiconductor substrate.

3. The method of claim 1 wherein the monomers comprise acrylate or diacrylate.

4. The method of claim 1 wherein a weight of the monomers is less than 5% of the liquid crystal material.

5. The method of claim 1 wherein the transparent conductive layer comprises indium tin oxide (ITO).

6. The method of claim 1 wherein the curing process is performed by irradiating the liquid crystal layer with ultraviolet (UV) light.

7. A method of fabricating a liquid crystal on silicon (LCOS) display panel, the method comprising the following steps:

providing a semiconductor substrate, the semiconductor substrate comprising a control circuit and a plurality of electrodes;

providing a transparent conductive layer;

combining the transparent conductive layer onto the semiconductor substrate;

performing a liquid crystal filling process to fill cell gaps with a liquid crystal material comprising liquid crystal molecules and monomers;

generating a uniform magnetic field through the liquid crystal material to align the liquid crystal molecules and monomers in a predetermined direction along the direction of the magnetic field; and irradiating the liquid crystal material with ultraviolet (UV) light to cure the monomers and form a polymer network with the predetermined direction.

8. The method of claim 7 wherein the monomers comprise acrylate on diacrylate.

9. The method of claim 7 wherein a weight of the monomers is less than 5% of the liquid crystal material.

10. The method of claim 7 wherein the transparent conductive layer comprises indium tin oxide (ITO).

* * * * *